Jan. 1, 1957 C. K. CLAUER 2,776,336

DUAL FUNCTION FACSIMILE APPARATUS

Filed Dec. 13, 1954 3 Sheets-Sheet 1

INVENTOR.
CALVIN K. CLAUER
BY Hudson, Boughton,
Williams, David & Hoffmann
ATTORNEYS Jan. 1, 1957 C. K. CLAUER 2,776,336

DUAL FUNCTION FACSIMILE APPARATUS

Filed Dec. 13, 1954 3 Sheets-Sheet 2

INVENTOR.
CALVIN K. CLAUER
BY Hudson, Boughton, Williams, David & Hoffmann
ATTORNEYS Jan. 1, 1957 C. K. CLAUER 2,776,336

DUAL FUNCTION FACSIMILE APPARATUS

Filed Dec. 13, 1954 3 Sheets-Sheet 3

INVENTOR.
CALVIN K. CLAUER
BY Hudson, Boughton, Williams, David & Hoffmann
ATTORNEYS 2,776,336

DUAL FUNCTION FACSIMILE APPARATUS

Calvin K. Clauer, Rocky River, Ohio

Application December 13, 1954, Serial No. 474,822

18 Claims. (Cl. 178—6.6)

This invention relates to facsimile apparatus for use in the scanning, transmission and reproduction of written or printed information or indicia of any kind desired to be transmitted or reproduced.

An object of the invention is to provide facsimile apparatus with which the reproduction of indicia can be accomplished in the same apparatus simultaneously with a scanning operation, or simultaneously with an operation of scanning the indicia and transmitting the same to a remote station.

Another object is to provide facsimile apparatus comprising both a scanning means and a reproducing means.

A further object is to provide facsimile apparatus comprising an indicia supply means and an indicia recording means associated with different portions of a guide track means, and in which one or more heads are movable along the guide track means for cooperation with the indicia supply means and the indicia recording means.

Still another object is to provide facsimile apparatus of the character mentioned in which the head or heads comprise a scanning means for cooperation with the indicia supply means and a reproducing means for cooperation with the indicia recording means.

Yet another object is to provide such a facsimile apparatus in which there are two conjointly movable heads each carrying a scanning means and a reproducing means, and in which one head is movable along and in scanning cooperation with the indicia supply means simultaneously with a reproducing cooperative movement of the other head along the indicia recording means.

It is also an object of this invention to provide a facsimile apparatus in which the head or heads are provided with sets of contacts connected, respectively, with the scanning and reproducing means and which sets of contacts are engageable with different sets of conductor bars during the scanning and reproducing cooperative movements of the head or heads along the indicia supply and recording means.

This invention also provides facsimile apparatus of the character indicated above in which the head or heads are actuated in response to relative movement between a cam member and a guide member, the latter having guide track portions extending adjacent the indicia supply means and the indicia recording means, respectively.

As a further object, the invention provides facsimile apparatus of the kind above referred to in which the guide track is an endless guide track carried by a stationary hollow guide member and the cam member is coaxially rotatable in the guide member, the coaxially disposed guide member and cam member being located between the indicia supply means and the indicia recording means.

Additionally, this invention provides facsimile apparatus of the kind mentioned above in which the endless guide track includes longitudinal portions on opposite sides of the guide member and facing toward the indicia supply means and the indicia recording means, and in which the heads carrying the scanning and reproducing means are propelled around the endless guide track by having follower elements in cooperation with the guide track and the rotatable cam means.

The invention can be further briefly summarized as consisting in certain novel combinations and arrangements of parts hereinafter described and particularly set out in the claims hereof.

This application is related as to subject matter to application Serial No. 447,734 filed August 4, 1954.

In the accompanying sheets of drawings, forming a part of this specification:

Figure 1:
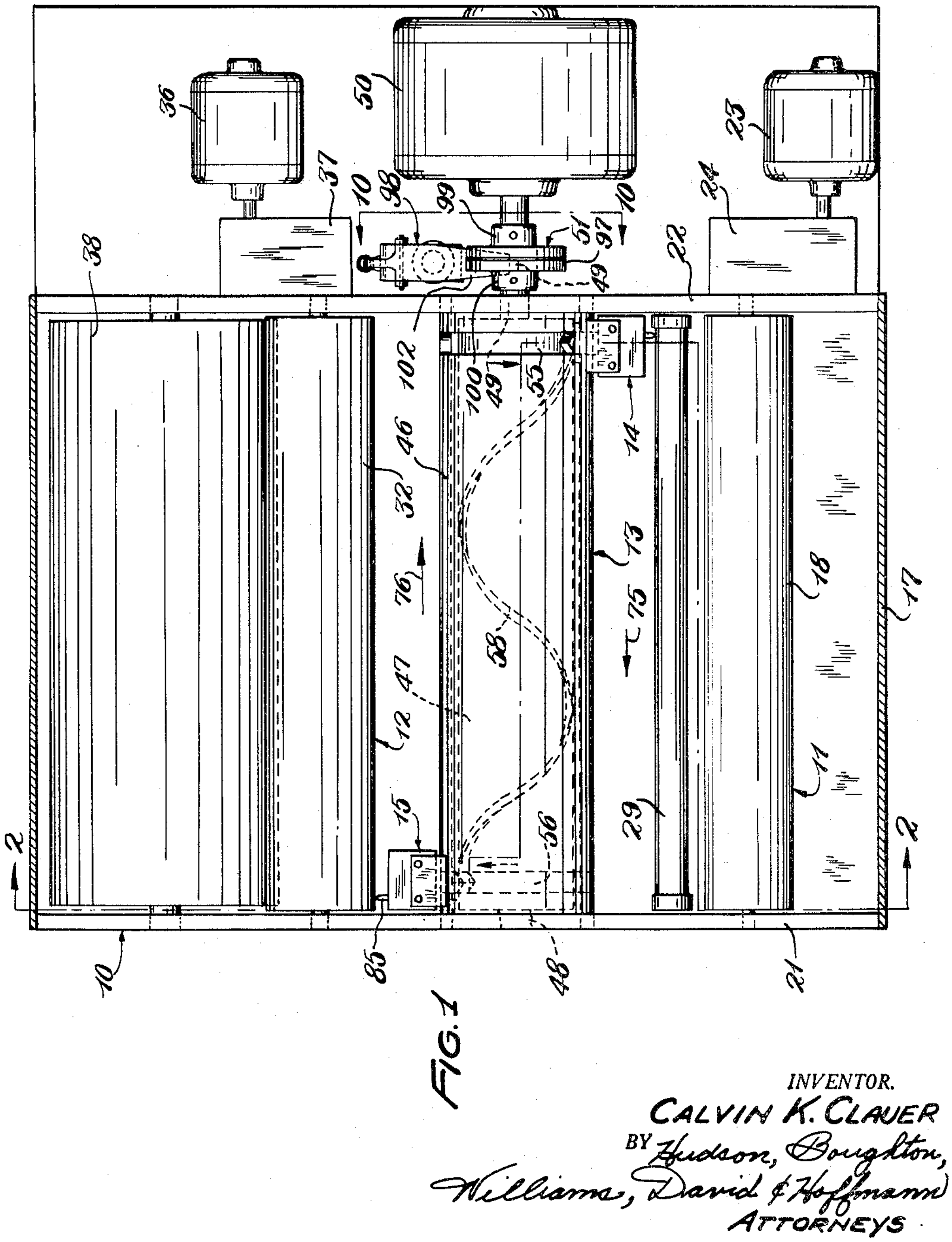
Fig. 1 is a top plan view of facsimile apparatus embodying this invention.

As representing one practical embodiment of the invention, the scanning apparatus 10 of the accompanying drawings comprises an indicia supply means 11 and an indicia recording means 12 located on opposite sides of a guiding and propelling means 13 which operates to move scanning and reproducing heads 14 and 15 in cooperating relation to such indicia supplying and recording means. The facsimile apparatus 10 also comprises a base 16 on which the above-mentioned components are suitably mounted, and a housing 17 connected with the base and extending in covering relation to the mechanism.

The indicia supply means 11 comprises a feed roll 18, over which a sheet or strip 19 carrying the indicia to be scanned is moved. A backing roll 20 cooperates with the feed roll 18 and presses the strip 19 against the latter. The feed roll 18 and the backing roll 20 are suitably mounted in a pair of spaced frame members or uprights 21 and 22 which are carried by the base 16. The feed roll 18 is driven as by means of an electric motor 23 which is connected therewith through a reduction gearing 24.

The indicia supply means 11 also comprises a shoe or masking member 26 extending laterally between the frame members 21 and 22 and disposed adjacent the feed roll 18, such that the strip 19 passes between this shoe and the feed roll. The shoe 26 is provided with a longitudinal slot 27 which exposes a desired area of the indicia strip 19 for scanning by the movable heads 14 and 15, as will be presently explained. The shoe 26 also serves as a guiding and holding means by which the strip 19 is maintained in a smooth and unwrinkled condition in passing the scanning slot 27, and directs the strip out of the housing 17 through the exit opening 28 after the indicia has been scanned.

The indicia carried by the strip 19 is suitably illuminated by light supplied thereto through the scanning slot 27. In this instance, two elongated tubular lamps 29 and 30, such as fluorescent lamps, are located adjacent the shoe 26 so as to throw a suitable amount of light onto the portion of the strip which is exposed by the scanning slot 27.

The indicia recording means 12 comprises a platen roll 32 and a backing roll 33 between which a pair of indicia recording strips 34 and 35 are movable. The rolls 32 and 33 are suitably mounted in the frame members 21 and 22, and the platen roll 32 is adapted to be driven as by means of an electric motor 36 connected therewith through a reduction gearing 37.

Figures 2, 5, 6, 7, 8, 9:
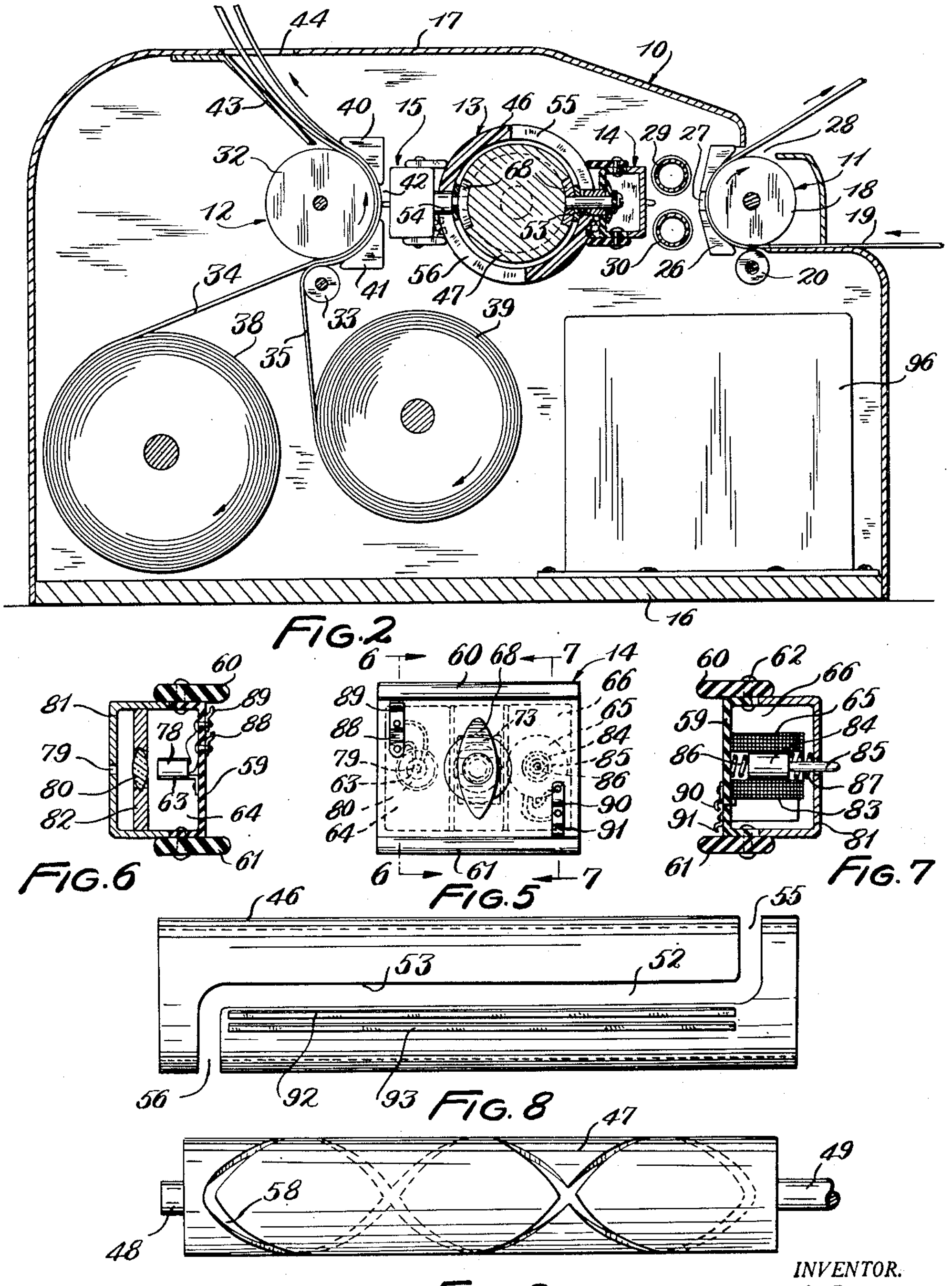
Fig. 2 is a transverse vertical section taken through the apparatus on the irregular section line 2—2 of Fig. 1.
Fig. 5 is an elevation of one of the heads in detached relation and as seen from the cam follower side thereof.
Fig. 6 is a transverse section taken through the scanning means of the head as indicated by section line 6—6 of Fig. 5.
Fig. 7 is a transverse section taken through the reproducing means of the head as indicated by section line 7—7 of Fig. 5.
Fig. 8 is a side elevation of the guide member in detached relation.
Fig. 9 is a side elevation of the cam member in detached relation.

The strip 34 is withdrawn from a supply roll 38 by the platen roll 32 and comprises a record-forming strip, such as a strip of paper on which the indicia is to be reproduced and recorded. The strip 35 is also withdrawn from a supply roll 39 by the platen roll 32 and comprises a transfer strip, such as a strip of carbon paper, or the like, which will be effective to apply the indicia to the adjacent surface of the record strip 34 in response to the application of a transfer medium, such as pressure, to the transfer strip during the passage of the strips over the platen roll 32 in a superposed relation, as shown in Fig. 2 of the drawings.

The indicia recording means 12 also comprises a pair of spaced guide bars or shoes 40 and 41 located adjacent the platen roll 32 and defining a laterally extending space or slot 42, through which a desired portion of the transfer strip 35 is exposed. The shoes 40 and 41 also serve to direct the superposed strips 34 and 35 around the platen roll 32 in a smooth and unwrinkled condition. As the strips 34 and 35 leave the platen roll 32, they are directed by the shoe 40 across a deflector plate 43 from which the strips pass to the outside of the housing 17 through the exit opening 44.

The guiding and propelling unit 13 comprises a stationary tubular guide member 46 mounted on, and extending between, the frame members 21 and 22, and a substantially cylindrical cam member 47 rotatable in the hollow guide member in a substantially coaxial relation thereto. The cam member 47 has shaft projections 48 and 49 thereon by which it is rotatably mounted in the frame members 21 and 22 and is adapted to be driven by an electric motor 50 which is connected with the shaft projection 49 by a clutch device 51.

The wall of the guide member 46 is provided with a guide slot or passage defining an endless guide track 52 which includes longitudinal guide track portions 53 and 54, located on opposite sides of the guide member, and connecting guide track portions 55 and 56 which extend circumferentially of the guide member adjacent the ends thereof and connect the longitudinal guide track portions 53 and 54. The guiding and propelling unit 13 is located between the indicia supply and recording units 11 and 12, such that the longitudinal guide track portion 53 is presented toward the indicia supply unit 11 and the longitudinal guide track portion 54 is presented toward the indicia recording unit 12. The guide track portions 53, 54, 55 and 56 constitute the above-mentioned endless guide track and are traversed in succession by the heads 14 and 15, as is explained hereinafter.

The cam member 47 is preferably in the form of a cylindrical member or roll having connected right-hand and left-hand helical thread groove portions therein defining an endless cam track 58. The cam track 58 extends along and around the cam member 47 and has a pitch and number of turns suitable for cooperation with the guide track 52 in propelling the heads 14 and 15 in the latter.

The heads 14 and 15 are combined scanning and reproducing heads which are conjointly movable around the endless guide track 52 in response to rotation of the cam member 47 relative to the guide member 46. The heads 14 and 15 are of a substantially identical construction and each includes a body formed by a casing section 59, and a pair of positioning strips or shoes 60 and 61 secured to such casing section at the top and bottom thereof, as by means of the rivets 62. The heads 14 and 15 also include a scanning device 63 located in one portion of a chamber 64, and a reproducing device 65 located in an adjacent chamber or chamber portion 66.

The heads 14 and 15 also comprise follower members 67 and 68 which cooperate, respectively, with the guide track 52 and the cam track 58. The follower member 67 is here shown as being a sleeve connected with, and projecting from, the casing section 59 into the slot of the guide track 52 for operation in the latter. The follower member 68 is a substantially elliptical or boat-shaped member having relatively pointed ends and which slidably operates in the groove of the cam track 58.

The follower member 68 is fixed on the inner end of a stem 72 which extends through the passage of the sleeve 67. A washer-like thrust member 69 surrounds the stem 72 and is disposed between the follower member 68 and the inner end of the follower member 67 and is in sliding engagement with the curved inner surface 70 of the guide member 46. This thrust member operates in the intervening annular space 71 provided between the guide member 46 and the cam member 47.

A spring washer 73 of dished shape is secured to the outer end of the stem 72 by means of the screw 74 and presses against the bottom wall of the casing section 59 so as to exert a pulling force on the stem by which the thrust member 69 is yieldably pressed against the inner surface 70 of the guide member 46 for the above-mentioned sliding movement thereon. The spring washer 73 thus cooperates with the follower members 67 and 68, and with the thrust member 69, for taking up looseness and for yieldingly pressing the strips 60 and 61 against the outer surface of the guide member 46, such that the head will be longitudinally slidable on the guide member 46 during the operation of the follower members 67 and 68 in the guide track and cam track, respectively.

With the construction and mounting just described above for the heads 14 and 15, it will be seen that during rotation of the cam member 47 in the guide member 46, the follower members 68 will be moved longitudinally of the unit 13 by the cam track 58 while the follower members 67 are confined in the longitudinal portions 53 and 54 of the guide track 52. The heads 14 and 15 are thus conjointly movable around the endless guide track 52 in spaced relation, such that while the head 14 is moving along the straight guide track portion 53 in one direction, such as from right to left as indicated by the arrow 75, the head 15 will be moved along the straight guide track portion 54 in the opposite direction as indicated by the arrow 76.

When the head 14 reaches the end of the straight guide track portion 53, it moves circumferentially of the guide member by traversing the circumferential connecting guide track portion 55 and is thereby transferred from the longitudinal straight guide track portion 53 to the longitudinal straight guide track portion 54. Similarly, the head 15 is transferred from the longitudinal straight guide track portion 54 to the longitudinal straight guide track portion 53 through the circumferentially extending connecting guide track portion 56. During the movement of the head 14 along the longitudinal guide track portion 53, it is in a cooperating scanning relation to the indicia supply means 11, and during movement of the head 15 along the longitudinal guide track portion 54, the latter head is in cooperating relation to the indicia recording means 12.

As has been indicated above in a general way, one of the scanning devices 63 and one of the reproducing devices 65 are carried by each of the heads 14 and 15 and are located on the head in a side-by-side relation facing in the opposite direction from the follower members 67 and 68. The scanning device 63 comprises a light-sensitive electric impulse producing means 78 suitably mounted on the casing section 59 so as to be located in alignment with a scanning aperture 79 and a lens 80 disposed between such light-sensitive means and aperture. The scanning aperture is provided in a cover section 81 of the casing of the head, and the lens 80 is suitably mounted in a lens carrier 82 of the cover section.

During movement of either of the heads 14 or 15 along the longitudinal guide track portion 53, the scanning aperture 79 will be presented toward the indicia supply means 11, such that light reflected from the indicia strip 19 through the slot 27 will enter the scanning aperture 79 and will be converged on the light-sensitive means 78 by the lens 80. The light-sensitive means 78 will respond to such reflected light to generate electric impulses in accordance with variations in the reflectiveness of the different indicia, or of the different portions of the indicia, carried by the strip 19.

The reproducing means 65 of each head comprises a solenoid magnet coil 83, and a magnet plunger 84 movable in such coil in response to changes in the energization thereof. The plunger 84 carries a stylus 85 which projects from the head through an opening of the cover section 81. The plunger 84 is centered in the passage of the coil 83 by suitable compression springs 86 and 87 engaging opposite ends of the plunger.

During movement of the heads 14 and 15 along the longitudinal guide track portion 54 in cooperating relation with the indicia recording means 12, the stylus 85 will be in engagement with the transfer strip 35. Variations in the energization of the magnet coil 83 will cause variations in the amount of pressure with which the stylus 85 is pressed against the transfer strip 35, such that the action of the stylus on the transfer strip will result in the desired indicia being recorded on the record strip 34.

Each of the heads 14 and 15 carry two sets of electric contacts 88, 89 and 90, 91. The contacts 88 and 89 cooperate with a pair of conductor bars 92, 93 which are mounted on the guide member 46 adjacent the longitudinal guide track portion 53. The contacts 90, 91 cooperate with a similar pair of conductor bars 94, 95 provided on the guide member 46 adjacent the longitudinal guide track portion 54. While the heads are moving along the longitudinal guide track portion 53 with the scanning device 63 in cooperation with the indicia supply means 11, the contacts 88 and 89 operate on the conductor bars 92 and 93 so as to complete the electric circuit connections for the scanning device. During this scanning travel of the heads 14 and 15 along the guide track portion 54, the contacts 90 and 91 of the reproducing means 65 are idle. Similarly, during the movement of the heads 14 and 15 along the guide track portion 54 with the reproducing means 65 in cooperating relation with the indicia recording means 12, the contacts 90 and 91 operate on the conductor bars 94 and 95 to complete the circuit connections for the reproducing means 65 and, at this time, the contacts 88 and 89 are idle.

With the parts of the facsimile apparatus 10 in the relative positions shown in the drawings, the head 14 is functioning as a scanning head whose scanning means 63 is generating and delivering electric impulses through the contacts 88 and 89 and the conductor bars 92 and 93. At the same time, the head 15 is operating as a reproducing head and its reproducing means 65 is responding to electric impulses supplied thereto through the contacts 90, 91 and the conductor bars 94, 95 to cause the stylus 85 to record the desired indicia on the record strip 34.

In the drawings the guide member 46 and the casing section 59 of the heads are shown as being made of an insulating material, such that the conductor bars 92, 93 and 94, 95 will be insulated from each other, and such that the contacts 88, 89 and 90, 91 will be insulated from each other. The guide member 46 and the casing section 59 can, of course, be made of metal if desired and, in that case, the conductor bars and contacts would be suitably insulated.

When the reproducing head 15 is electrically connected in circuit with the scanning or transmitting head 14, the indicia recorded on the record strip 34 will be a reproduction of the indicia being scanned and transmitted by the head 14. The impulses being sent out by the scanning head 14 can be supplied to the reproducing head of a similar facsimile apparatus located at a remote point, as well as the reproducing head 15 of the local facsimile apparatus 10. The facsimile apparatus 10 can also be operated in conjunction with a remotely located similar apparatus with the reproducing head 15 of the local apparatus connected in circuit with the scanning head of the remotely located apparatus. Thus, in the facsimile apparatus 10, the reproducing head 15 can be made to function for reproducing the same indicia as is being transmitted by the scanning head 14, or can be used to reproduce entirely different indicia being received from a remote apparatus in a two-way transmission. It will also be understood that the facsimile apparatus 10 can be operated with the scanning head 14 functioning alone as a transmitting apparatus in which the reproducing means is idle, or as a receiving apparatus with the reproducing head 15 functioning alone while the scanning means is idle.

Although the facsimile apparatus 10 has been illustrated and described herein as embodying the two heads 14 and 15, it should be understood that, if desired, one of these heads could be omitted and the apparatus could be successfully operated with only a single head either as a transmitting apparatus or as a receiving apparatus. The facsimile apparatus 10 can also be provided with more than two heads of the kind represented by the heads 14 and 15. When such an increased number of heads is provided, they are preferably though not necessarily, of an even number. When four such heads are used, for example, a desired one hundred percent line-use ratio or function is obtained during the operation of the apparatus 10.

Electric circuit mechanism, appropriate for facsimile apparatus of the character herein disclosed and including switches, relays and amplifying devices, can be located in a suitable unit 96 mounted on the base 16 inside of the outer housing 17.

Figure 10:
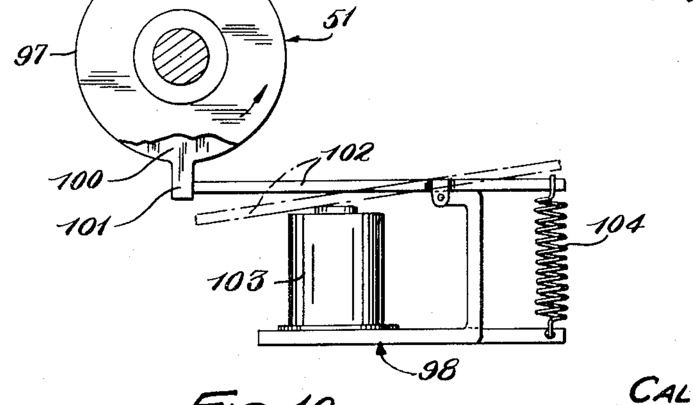
Fig. 10 is a transverse vertical section taken on line 10—10 of Fig. 1 and showing a synchronization control device.

The clutch device 51 is here shown (see Fig. 10) as comprising a coupling 97 and an electromagnetic latch device 98. The coupling 97 comprises clutch members 99 and 100 which are connected respectively with the motor 50 and the shaft projection 49. Frictional cooperation between the clutch members 99 and 100 is such that the clutch member 99 will drive the clutch member 100 except at such times as the latter clutch member is held against rotation by the latch device 98. For this holding purpose, the clutch member 100 has a radial shoulder or lug projection 101 thereon.

The latch device 98 comprises a swingable latch member 102 which also forms an armature for a magnet coil 103. A tension spring 104 is connected with the member 102 and tends to swing the same away from the magnet coil 103 and into the path of rotational movement of the lug 101. The latch device 98 is suitably mounted adjacent the coupling 97 and is disposed for engagement of the end of the member 102 by the lug 101 whenever the magnet coil 103 is deenergized.

When the latch member 102 is engaged by the lug 101, the clutch member 100 will be stopped while clutch member 99 continues to be driven by the motor 50 and slips relative to the clutch member 100. The latch member 102 thus stops the rotation of the cam member 47 whenever the energizing current being supplied to the magnet coil 103 is interrupted.

Figures 3, 4:
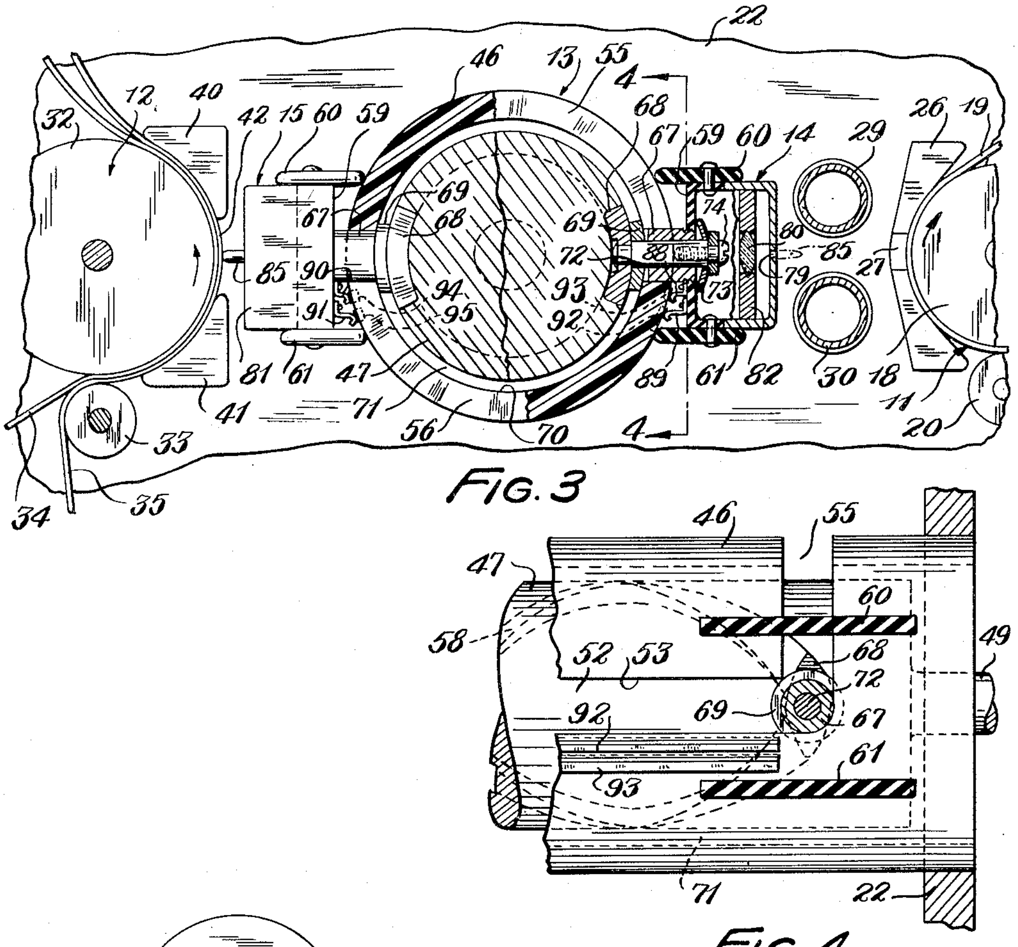
Fig. 3 is a partial transverse vertical section corresponding with a portion of Fig. 2 and showing the same on a larger scale.
Fig. 4 is a fragmentary longitudinal vertical section taken on section line 4—4 of Fig. 3.

The operation of the latch device 98 is such that each time the cam member 47 is stopped thereby, the scanning head 14 will be substantially at the end of the longitudinal guide track portion 53 as shown in Figs. 1 and 4, while the clutch member 99 continues to rotate. Energization of the magnet coil 103 moves the latch member 102 in a direction to release the lug 101, whereupon the clutch member 100 will again be rotated by the clutch member 99 to drive the cam member 47. Suitable energizing circuit means is provided for the magnet coil 103 to accomplish the above-described operation of the latch device 93 and the clutch device 51.

By means of the clutch device 51 and the latch device 98, the facsimile apparatus 10 can be controlled and adjusted so as to synchronize its head or heads, as to the position thereof in the scanning or reproducing movement, with respect to similar movements of the head or heads of another such facsimile apparatus.

From the accompanying drawings and the foregoing detailed description, it will now be readily understood that this invention provides facsimile apparatus of a very simple and practical construction in which scanning and reproducing heads are movable in a spaced-apart relation around an endless guide track and in cooperating relation to an indicia supply means and an indicia recording means. It will now also be understood that the head or heads of the apparatus carry both a scanning means and a reproducing means, such that during one portion of the path of travel, the scanning means of the heads cooperates with the indicia supply means, and the reproducing means of the heads cooperates with the recording means during another portion of the path of travel.

Although this novel facsimile apparatus has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In facsimile apparatus, an indicia supply means, an indicia recording means, a guide means defining a guide track having a first portion extending adjacent said indicia supply means and a second portion extending adjacent said indicia recording means, a head movable with respect to said guide means along said first and second portions of said guide track in succession, a scanning means carried by said head and cooperating with said indicia supply means during movement of said head along said first portion of the guide track, and a reproducing means carried by said head and cooperating with said recording means during movement of said head along said second portion of the guide track.

2. In facsimile apparatus, an indicia supply means, an indicia recording means, a guide means defining an elongated closed-loop guide track having a first portion extending adjacent said indicia supply means and a second portion extending adjacent said indicia recording means, a head movable with respect to said guide means along said first and second portions of said guide track in succession, a scanning means carried by said head and cooperating with said indicia supply means during movement of said head along said first portion of the guide track, a reproducing means carried by said head and cooperating with said recording means during movement of said head along said second portion of the guide track, and propelling means operable to propel said head around the closed loop of said guide track.

3. In facsimile apparatus, an indicia supply means, an indicia recording means, a guide means defining a closed-loop guide track having a first portion extending adjacent said supply means and a second portion extending adjacent said recording means, first and second heads movable with respect to said guide means along said guide track, means operable to propel said heads around the closed loop of said guide track with the heads movable respectively along said portions of the guide track substantially in unison, a scanning means carried by each head and cooperating with said indicia supply means during movement of the heads along said first portion of the guide track, and a reproducing means carried by each head and cooperating with said indicia recording means during movement of the heads along said second portion of the guide track.

4. In facsimile apparatus, an indicia supply means, an indicia recording means, a guide means defining a closed-loop guide track having a first portion extending adjacent said indicia supply means and a second portion extending adjacent said indicia recording means, a head movable with respect to said guide means along said first and second portions of said guide track in succession, propelling means operable to propel said head around the closed loop of said guide track, a scanning means carried by said head and cooperating with said supply means during movement of said head along said first portion of the guide track, a reproducing means carried by said head and cooperating with said record means during movement of said head along said second portion of the guide track, a first set of conductor bars adjacent said first portion of the guide track, a first set of contacts carried by said head and engaging said first set of conductor bars for connecting said scanning means with the latter during movement of said head along said first portion of the guide track, a second set of conductor bars adjacent said second portion of the guide track, and a second set of contacts carried by said head and engaging said second set of conductor bars for connecting said reproducing means with the latter during movement of said head along said second portion of the guide track.

5. In facsimile apparatus, an indicia supply means, an indicia recording means, a guide means defining a closed-loop guide track having a first portion extending adjacent said indicia supply means and a second portion extending adjacent said indicia recording means, first and second heads movable respectively with respect to said guide means along said guide track, means operable to propel said heads around the closed loop of said guide track with the heads movable respectively along said portions of the guide track substantially in unison, a scanning means carried by each head and cooperating with said indicia supply means during movement of each head along said first portion of the guide track, a reproducing means carried by each head and cooperating with said indicia recording means during movement of each head along said second portion of the guide track, a first set of conductor bars adjacent said first portion of the guide track, a second set of conductor bars adjacent said second portion of the guide track, a first set of contacts carried by each head and engaging said first set of conductor bars for connecting the scanning means with the latter during movement of each head along said first portion of the guide track, and a second set of contacts carried by each head and engaging said second set of conductor bars for connecting the reproducing means with the latter during movement of each head along said second portion of the guide track.

6. In facsimile apparatus, a pair of relatively rotatable members carrying respectively an endless guide track and an endless cam track, an indicia supply means, an indicia recording means, said guide track having a first portion extending adjacent said indicia supply means and a second portion extending adjacent said indicia recording means, a head having follower portions engaging said guide track and cam track respectively and being movable along said cam track in response to the relative rotation between said members, a scanning means carried by said head for cooperation with said indicia supply means during movement of said head along said first portion of the guide track, a reproducing means carried by said head for cooperation with said indicia recording means during movement of said head along said second portion of said guide track, and means for producing the relative rotation between said members.

7. Facsimile apparatus as defined in claim 6 in which said scanning means is a light-responsive electric impulse producing means and said reproducing means is an electromagnetic stylus device.

8. In facsimile apparatus, a pair of relatively rotatable members carrying respectively an endless guide track and an endless cam track, an indicia supply means, an indicia recording means, said guide track having a first portion extending adjacent said indicia supply means and a second portion extending adjacent said indicia recording means, a pair of heads spaced apart along said guide track and each having a pair of follower members thereon engaging said guide track and cam track respectively for propelling said heads along said guide track substantially in unison in response to relative rotation between said members with one of said heads moving along said first portion of the guide track simultaneously with movement of the other head along said second portion of the guide track, a scanning means carried by each head for cooperation with said indicia supply means during movement of the heads along said first portion of the guide track, a reproducing means carried by each head for cooperation with said recording means during movement of the heads along said second portion of the guide track, and means for producing the relative rotation between said relatively rotatable members.

9. In facsimile apparatus, an indicia supply means, an indicia recording means, a stationary hollow guide member having an endless guide track thereon including a first guide track portion adjacent said indicia supply means and a second guide track portion adjacent said indicia recording means, a cam member rotatable in said guide member and carrying an endless cam track, a head having follower elements engaging said guide track and cam track respectively for propelling said head along said guide track in response to rotation of said cam member, a scanning means carried by said head for cooperation with said indicia supply means during movement of said head along said first guide track portion, a reproducing means carried by said head for cooperation with said indicia recording means during movement of said head along said second guide track portion, and drive means connected with said cam member to rotate the same.

10. In facsimile apparatus, an indicia supply means, an indicia recording means, a stationary hollow guide member having an endless guide track thereon including a first guide track portion adjacent said indicia supply means and a second guide track portion adjacent said indicia recording means, a cam member rotatable in said guide member and carrying an endless cam track, a pair of heads spaced apart along said guide track and each having a pair of follower elements thereon engaging said guide track and cam track respectively for propelling said heads along said guide track substantially in unison in response to rotation of said cam member with one of said heads moving along said first guide track portion simultaneously with movement of the other head along said second guide track portion, a scanning means carried by each head for cooperation with said indicia supply means during movement along said first guide track portion, a reproducing means carried by each head for cooperation with said indicia recording means during movement along said second guide track portion, and drive means operable to rotate said cam member.

11. Facsimile apparatus as defined in claim 10 in which said first and second portions of said guide track are located on opposite sides of said guide member, and in which said guide member is disposed between said indicia supply means and said indicia recording means.

12. Facsimile apparatus as defined in claim 10 in which said first and second portions of said guide track are substantially straight guide track portions extending longitudinally of said guide member on opposite sides thereof and have their adjacent ends connected by other guide track portions extending substantially circumferentially of said guide member, and in which said guide member is disposed between said indicia supply means and said indicia recording means with said straight guide track portions presented toward the latter two means.

13. Facsimile apparatus as defined in claim 10 in which said scanning means comprises a light-sensitive electric impulse generating means, and in which said reproducing means comprises an electromagnetic electric impulse responsive stylus means.

14. Facsimile apparatus as defined in claim 10 in which said indicia supply means comprises a driven roller means supporting a sheet carrying indicia and a light source for illuminating said indicia, and in which said indicia recording means comprises a driven roller means supporting a record sheet means.

15. Facsimile apparatus comprising; indicia supply means; indicia recording means; a stationary hollow guide member between said supply means and said recording means; said guide member having a slot therein defining an endless guide track including substantially straight first and second longitudinal guide track portions on opposite sides of the guide member and facing toward said supply means and said recording means, and connecting guide track portions extending substantially circumferentially of said guide member and connecting the adjacent ends of said longitudinal guide track portions; a cam member rotatable in said guide member and carrying an endless cam track; conductor bars on said guide member adjacent said longitudinal guide track portions; a pair of heads spaced apart along said guide track and each having a pair of follower elements thereon engaging said guide track and cam track respectively for propelling said heads along said longitudinal and connecting guide track portions substantially in unison in response to rotation of said cam member, with one of said heads moving along one of said longitudinal guide track portions simultaneously with movement of the other head along the other longitudinal guide track portion; a scanning means carried by each head for cooperation with said supply means during movement along said first longitudinal guide track portion; a reproducing means carried by each head for cooperating with said recording means during movement along said second longitudinal guide track portion; first and second sets of conductor bars on said guide member adjacent said first and second longitudinal guide track portions; a first set of contacts on each head for engagement with said first set of conductor bars for connecting said scanning means with the latter during movement of the heads along said first longitudinal guide track portion; a second set of contacts on each head for engagement with said second set of conductor bars for connecting said reproducing means with the latter during movement of said heads along said second longitudinal guide track portion; and drive means connected with said cam member for rotating the same.

16. In a facsimile apparatus, a guide means defining an elongated closed loop guide track having first and second opposite side portions extending parallel to a plane, a head movable with respect to said guide means along said guide track, facsimile means carried by said head, and means providing first and second sheets of material adjacent said first and second portions respectively and each adapted to cooperate with said facsimile means in performing a facsimile operation, means for connecting said facsimile means carried by the movable head into a first electrical circuit as said head moves along the first portion of said guide track and into a second electrical circuit as said head moves along the second portion of said guide track.

17. In a facsimile apparatus, a guide means providing an endless guide track having first and second portions, a head movable with respect to said guide means along said guide track, cam means adjacent said guide track and operatively connected to said head and effective to move said head along said guide track upon relative rotation between said guide means and said cam track, facsimile means carried by said head, and means providing a sheet of material adjacent each of said portions with each sheet being adapted to cooperate with said facsimile means in performing a facsimile operation.

18. In a facsimile apparatus, a guide means providing an endless guide track having first and second portions, a head movable with respect to said guide means along said guide track, cam means adjacent said guide track and operatively connected to said head and effective to move said head along said guide track upon relative rotation between said guide means and said cam track, facsimile means carried by said head, means providing a sheet of material adjacent each of said portions and cooperating with the last-said means to perform a facsimile operation, and means for connecting said facsimile means carried by the movable head into a first electrical circuit as said head moves along the first portion of said guide track and into a second electrical circuit as said head moves along the second portion of said guide track.

References Cited in the file of this patent

UNITED STATES PATENTS

| | | |
|---|---|---|
| 1,800,031 | Schroter | Apr. 7, 1931 |
| 1,918,124 | Nicolson | July 11, 1933 |
| 1,925,814 | Nicolson | Sept. 5, 1933 |